Figure 1:
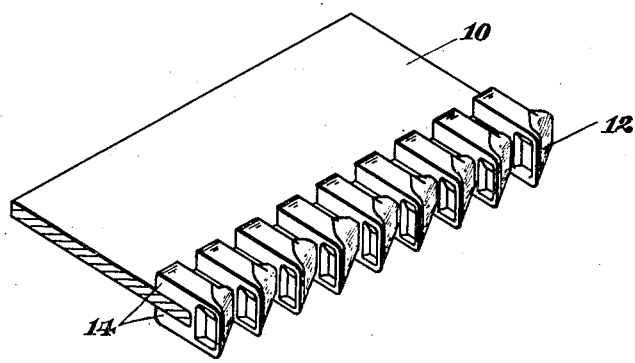

July 25, 1933.    G. H. C. CORNER    1,920,138
METHOD OF MAKING SLIDE FASTENERS
Filed Oct. 15, 1932

INVENTORS.
George H. C. Corner
BY
R. S. Kelley
ATTORNEYS.

Patented July 25, 1933

1,920,138

UNITED STATES PATENT OFFICE

GEORGE H. C. CORNER, OF BIRMINGHAM, ENGLAND, ASSIGNOR TO HOOKLESS FASTENER COMPANY, A CORPORATION OF PENNSYLVANIA

METHOD OF MAKING SLIDE FASTENERS

Application filed October 15, 1932, Serial No. 637,984, and in Great Britain October 17, 1931.

This invention relates to separable interlocking fasteners in which two rows of fastener members are attached to flexible supports and are so constructed that the members of one row interlock with those of the other row. The invention provides a new separable interlocking fastener in which the fastener members are of a non-metallic material which is light-weight, of any desired color, attractive in appearance, and smooth and otherwise pleasing to the touch due to its low heat conductivity.

The principal objects of the invention are to provide an interlocking fastener of this type which will be strong and durable, highly flexible without opening up, and in which the fastener members are very firmly and neatly secured to their flexible supports; and to provide an improved method of making such fasteners.

Other objects and advantages of the invention will be apparent from the accompanying description and drawing, the single figure of which is a perspective view of one form of fastener stringer constructed according to my invention.

Separable interlocking fasteners have heretofore been made of metal but the methods and apparatus for their manufacture are unsuited to making fasteners of non-metallic materials because non-metallic materials can not be successfully formed and bent to clamp them on flexible supports by such apparatus. While it has heretofore been proposed to make fasteners of artificial resins by casting the fastener members directly on the tape, such fasteners have not been entirely successful because of the difficulty and expense in their manufacture.

According to the present invention, fastener members are produced from a suitable non-metallic material and are then firmly attached to the tape by sticking, for example, cementing, gluing or by temporarily softening the material of the fastener member sufficiently to make it adhere to the fabric. The term "sticking" as used herein and in the appended claims, means causing the elements to adhere to the tape by the use of cement, glue or the like, or by softening the surfaces of the elements, and is intended to distinguish from affixing the elements to the tape by mechanical gripping or by casting them directly upon the tape.

The non-metallic material used in making the fastener members may be selected from a wide range of plastics; e. g., cellulose ester or ether material, resinous polymerized unsaturated organic compounds, phenol-aldehyde resins, urea- or thiourea-aldehyde resins, polyhydric-alcohol-polybasic-acid resins, or other artifical resins.

The fastener members may be shaped or formed by molding, die-casting, stamping or other forming process from the non-metallic material. They may be formed singly or in rows with proper spacing. Preferably I group the individual formed members with the required accurate and uniform spacing before inserting the tapes.

The sticking of the fastener members on the fabric tape may be effected by softening the jaws or the inside portions of the jaws by heat, solvents, or other means so that they become stuck to the fabric tape, when the members are applied on the tape. The tape may be saturated with a suitable solvent which softens the inner surfaces of the fastener members when applied to the saturated tape. When the solvent afterwards evaporates, the fastener members are firmly stuck to the tape by a dried solution of the fastener member material. In the case of insoluble materials, the tape may be treated with a suitable adhesive or cementing material which may adhere both to the fabric and the material of the element when applied to the tape. It is important in the finished fastener that the fabric tape between the fastener members remain flexible in order to permit easy operation of the fastener.

When a resin is employed which is capable of being hardened, it is possible to effect hardening at any convenient stage in the process, e. g., before fashioning the fastener members or after fashioning and before fixing on the fabric tape or after they have been fixed on the fabric tape.

Referring to the single figure of the drawing, the fabric tape is indicated by the numeral 10 and the fastener members are shown in uniformly and closely spaced relation on the edge of the tape. The interlocking or projecting ends of the elements are indicated at 12 and the bifurcations or prongs by the numeral 14.

One convenient way of carrying my invention into effect will now be briefly described. I will assume that a cellulose ester material, which is easily soluble, is to be used. The members are formed to the desired shape with the narrow tape receiving slots, the projections and recesses. The members may then be placed in the desired spaced relation and in alignment, and the edge of a fabric tape which has been saturated with solvent is inserted in the aligned slots. The solvent will quickly soften the material of the fastener members sufficiently to cause them to adhere firmly to the tape upon evaporation of the solvent. After the solvent has evaporated, the fabric between the fastener members is clean and just as flexible as before.

While I have shown and described in this application one embodiment which my invention may assume in practice, it will be understood that this embodiment is merely for the purpose of illustration and description and that various other forms may be devised within the scope of my invention as defined in the appended claims.

What I claim as my invention is:

1. The method of making separable interlocking fasteners of the type having rows of non-metallic fastener members uniformly and closely spaced apart on flexible supports and having heads shaped so as to interlock when the members are intermeshed, comprising forming such fastener members of non-metallic material and thereafter attaching the formed members in uniformly and closely spaced relation on flexible supports by sticking and so that the flexible support between the fastener members remains flexible.

2. The method defined in claim 1 wherein the members are formed of a plastic material and are stuck on the flexible supports by softening the material of the fastener members sufficiently to cause them to adhere to the flexible support.

3. The method defined in claim 1 wherein the members are formed of a soluble plastic material and are stuck on the flexible supports by softening the support-contacting surfaces of the fastener members with solvent sufficiently to cause said surfaces to adhere to the flexible support.

4. The method defined in claim 1 wherein the members are formed of a plastic material and are stuck on the flexible supports by softening the support-contracting surfaces of the fastener members by heat sufficiently to cause them to adhere to the flexible support.

5. The method defined in claim 1 wherein the members are stuck on the flexible support by cementing.

6. The method of making separable interlocking fasteners of the type described comprising forming fastener members from non-metallic material with heads shaped so as to interlock when the members are intermeshed, each having a slot providing a U-shaped portion, and attaching the formed members in uniformly and closely spaced relation on a tape with the U-shaped portion embracing the edge of said tape by inserting the edge of said tape in the slots of the members and sticking the fastener members in place on the tape.

7. The method of making separable interlocking fasteners comprising forming fastener members of plastic material each member comprising a thin plate-like body having a tape receiving slot in one end and at the other end an interlocking projection on one side and recess on the other side, and attaching said members to a tape in uniformly closely spaced relation by impregnating the edge of a tape with a solvent and placing said edge in the tape receiving slots of the members to stick said members on the tape.

GEORGE H. C. CORNER.